June 17, 1930. F. A. HART ET AL 1,765,152
CONDIMENT HOLDER
Filed Nov. 14, 1928

FRANK A. HART
EARLE ASKEW
INVENTORS

BY Victor J. Evans
ATTORNEY

WITNESS

Patented June 17, 1930

1,765,152

UNITED STATES PATENT OFFICE

FRANK A. HART AND EARLE ASKEW, OF NEW YORK, N. Y.

CONDIMENT HOLDER

Application filed November 14, 1928. Serial No. 319,258.

This invention relates to improvements in condiment holders and particularly to a combined salt and pepper shaker.

The primary object of the invention resides in a single holder for two separate powdered substances, either of which may be discharged by inverting and shaking the holder without fear of discharging any of the other substance.

Another object of the invention is to provide a holder with two separate compartments, each having a discharge spout, and suitably arranged baffle walls within the respective compartments for restricting the flow of substance to the discharge spouts upon inverting the holder, and for preventing moisture from reaching the compartments which might cause lumping of the substances.

Some of the other objects are as follows:—
To provide a condiment holder which is easy to fill, clean and handle; to provide a holder with a low center of gravity to prevent accidental tipping over, and one which is not easily broken as there are no fragile projecting points.

A further object is to provide a condiment holder for the dispensing of two separate commodities ordinarily dispensed from two separate holders, which is simple of construction and inexpensive of manufacture.

A still further object is the provision of a condiment holder having a double compartment body and a removable top therefor, the top being held upon the body by perforated screw caps through which the condiments are dispensed.

With these and other objects in view, the invention resides in certain novel construction and combination and arrangement of parts, the essential features of which are hereinafter fully described, are particularly pointed out in the appended claims, and are illustrated in the accompanying drawing, in which—

Figure 1:
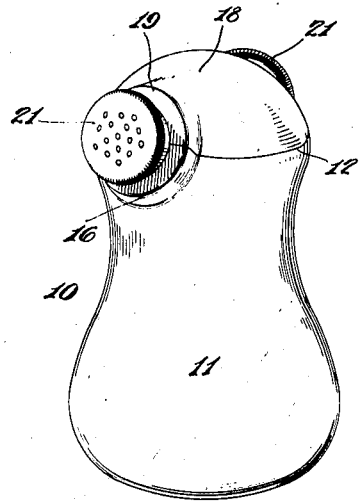
Figure 1 is a perspective view of our improved condiment holder.
Figure 2:
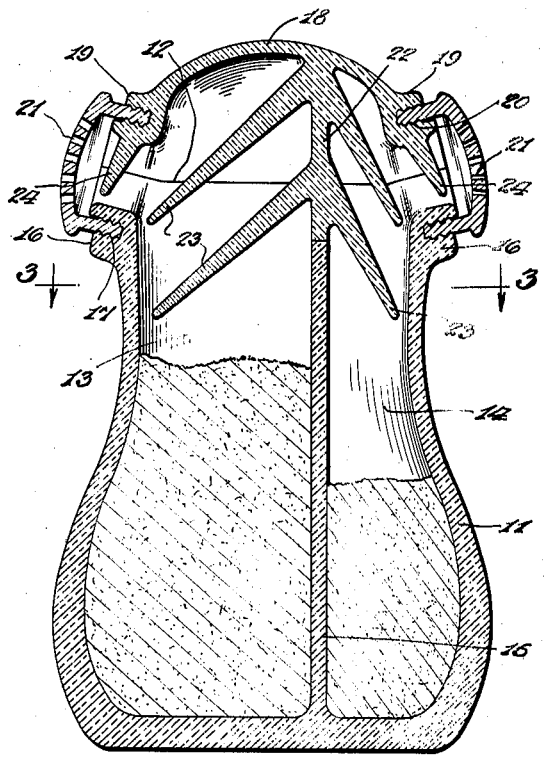
Figure 2 is a vertical longitudinal sectional view therethrough.
Figure 4:
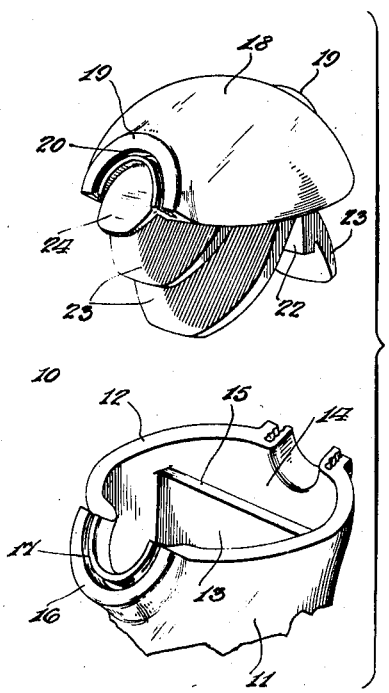
Figure 4 is a perspective view showing the top cover in a separated position with respect to the body of the holder.
Figure 3:
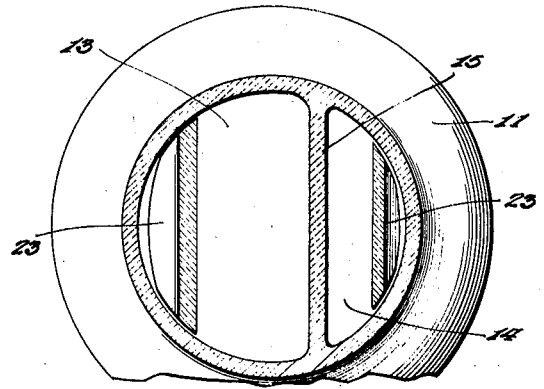
Figure 3 is a horizontal sectional view on the line 3—3 of Figure 2.

Referring to the drawing by reference characters, the numeral 10 designates our improved condiment holder in its entirety which is shown as constructed of glass, although it may be made of other suitable materials if desired. The holder includes a body 11 which is wider at the bottom than at the top and which is provided with an open top, the edges of which provide a ground seat 12. The interior of the body is divided into two separate compartments 13 and 14 by a vertical partition or wall 15 which rises upward from the bottom but which terminates just short of the plane of the top of the body. The partition is disposed off center to vary the size of the compartments, so that one is capable of containing more contents than the other. The holder being designed especially for salt and pepper, the large compartment 13 may receive the salt and the smaller compartment 14 the pepper, as it is well known that more salt would be dispensed in a given time than pepper.

The top of the body is formed with opposed semi-circular bosses 16 having similar shaped semi-circular threaded recesses 17 therein, while seated on the ground seat 12 of the body is a removable top or cover 18 provided with opposed semi-circular bosses 19 having similar shaped threaded recesses 20 therein. The bosses 16 and 17 on each side co-act to provide a continuous annular boss and the respective threaded recesses align to threadedly receive threaded perforated caps 21. These caps may be termed sifter caps as the contents of the compartments are adapted to be sifted therethrough and they also serve the purpose of securing the removable top to the body. By unscrewing the caps, the top 18 may be lifted free of the body and the tops of the compartments exposed for filling purposes.

The top cover is substantially dome shape to present no sharp corners which might accidentally become chipped or broken, and depending from the top is a partition or wall 22 which registers with the partition 15 when the top cover is in position upon the body. Extending downwardly and outwardly from the partition on opposite sides are baffles 23, the ends of which terminate just short of the outer side walls of the body to provide a restricted passage to the discharge openings. Baffles 24 also extend from the bosses 19 and terminate just short of the opposed bosses 16 to further restrict the flow to the discharge openings. The spaces between the baffles constitute pockets in which the contents of the compartments is trapped during inverting and shaking of the holder to prevent accidental dispensing of any condiment other than the one desired. The arrangement of the baffles also serves to prevent moisture from entering the compartments which might tend to affect lumping of the contents and the possible clogging up of the restricted passages. It might be well to mention that all of the baffle walls are formed in the cover so that when the cover is removed the upper open end of the compartments are free of any obstructions which might tend to interfere with the filling of the respective compartments or with the cleaning of the same.

From the foregoing description, it will be seen that when the compartments are filled with condiments, either condiment may be dispensed independently of the other by merely tilting the holder to one side and shaking the same, thus causing a plentiful flow of the condiment while the baffle walls of the other compartment prevent the escape of the condiment contained therein or of any dust therefrom.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. A condiment dispenser comprising a body open at the top, threaded semi-circular hollow bosses on said body, a cover seated on said body and having threaded semi-circular hollow bosses in mating relation with said first semi-circular bosses, thereby providing openings in said bosses, a partition in said body, a partition in said cover contacting with said first partition and providing a pair of compartments in said body, the openings of said bosses communicating with said compartments, and a pair of perforated caps having threads thereon in threaded engagement with the threads on said semi-circular bosses thereby removably attaching said cover on said body.

2. A condiment dispenser comprising a body open at the top, threaded semi-circular hollow bosses on said body, a cover seated on said body and having threaded semi-circular hollow bosses in mating relation with said first semi-circular bosses, thereby providing openings in said bosses, baffles carried on the inner surfaces of said first bosses and projecting into said openings to restrict the same, a partition in said body, a partition in said cover contacting with said first partition and providing a pair of compartments in said body, the openings in said bosses communicating with said compartments, and a pair of perforated caps having threads thereon in threaded engagement with the threads on said semi-circular bosses thereby removably attaching said cover to said body.

3. A condiment dispenser comprising in combination with a body open at the top and having a partition therein, a cover partly closing the open top and having also a partition therein, said latter partition engaging said first partition and providing a pair of compartments in the dispenser, semi-circular hollow bosses on opposite sides of the respective body and cover portions, said hollow bosses providing openings in the dispenser in communication with said compartments, baffles integral with the semi-circular bosses of said cover portion for restricting said openings, and perforated caps removably engaging the respective semi-circular bosses, substantially as and for the purpose described.

4. In a condiment dispenser comprising a body portion having an open top, a cover seated on the body portion for closing the open top, mating partitions in the respective body and cover portions, semi-circular, hollow, coacting bosses on the respective body and cover portions, and perforated caps removably engaging the respective semi-circular bosses, thereby removably attaching said body and cover portions.

In testimony whereof we hereby affix our signatures.

FRANK A. HART.
EARLE ASKEW.